US012619698B2

(12) United States Patent (10) Patent No.: US 12,619,698 B2

Okada (45) Date of Patent: May 5, 2026

(54) AUTHENTICATION APPARATUS, SYSTEM, METHOD, AND PROGRAM FOR MULTI-STAGE AUTHENTICATION

(71) Applicant: NEC Corporation, Tokyo (JP)

(72) Inventor: Hiroya Okada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 18/709,859

(22) PCT Filed: Dec. 3, 2021

(86) PCT No.: PCT/JP2021/044508

§ 371 (c)(1),
(2) Date: May 14, 2024

(87) PCT Pub. No.: WO2023/100362

PCT Pub. Date: Jun. 8, 2023

(65) Prior Publication Data

US 2025/0013726 A1 Jan. 9, 2025

(51) Int. Cl.
*G06F 21/00* (2013.01)
*G06F 21/32* (2013.01)

(52) U.S. Cl.
CPC ................................... *G06F 21/32* (2013.01)

(58) Field of Classification Search
CPC ................................. G06F 21/32; G06F 21/31
See application file for complete search history.

(56) References Cited

U.S. PATENT DOCUMENTS

| | | | |
|---|---|---|---|
| 8,806,599 B2 | 8/2014 | Roy | |
| 2016/0373440 A1* | 12/2016 | Mather | ............... G06F 21/6218 |

(Continued)

FOREIGN PATENT DOCUMENTS

| | | |
|---|---|---|
| JP | H10-269183 A | 10/1998 |
| JP | 2002-041469 A | 2/2002 |

(Continued)

OTHER PUBLICATIONS

International Search Report for PCT Application No. PCT/JP2021/044508, mailed on Feb. 22, 2022.

*Primary Examiner* — William A Corum, Jr.
(74) *Attorney, Agent, or Firm* — Sughrue Mion, PLLC

(57) ABSTRACT

Authentication apparatus includes: communication part capable of communicating with server apparatus that stores common authentication information and first distributed authentication information in association with each other via network; read part capable of reading information from user storage medium that stores common authentication information and second distributed authentication information; input part; and control part, wherein the control part authenticates by collating the second distributed authentication information acquired via the read part with the second distributed authentication information acquired from a user via the input part; transmits the common authentication information acquired via the read part to the server apparatus via the communication part; authenticates by collating the first distributed authentication information acquired from the server apparatus via the communication part with the first distributed authentication information acquired from the user via the input part; and unlocks a lock when completing authenticating all of the first distributed authentication information.

15 Claims, 9 Drawing Sheets

(56) References Cited

U.S. PATENT DOCUMENTS

| 2018/0241747 | A1* | 8/2018 | Tanaka | H04L 63/0869 |
|---|---|---|---|---|
| 2018/0268414 | A1* | 9/2018 | Chung | G06Q 20/409 |
| 2020/0012800 | A1* | 1/2020 | Karako | H04L 63/0853 |
| 2020/0259825 | A1* | 8/2020 | Van Prooijen | G06F 21/32 |
| 2021/0117524 | A1* | 4/2021 | Mckell-Redwood | ............... |
| | | | | H04L 9/3231 |
| 2022/0004612 | A1 | 1/2022 | Moriwaki et al. | |
| 2022/0414196 | A1* | 12/2022 | Caprioli | G06V 40/45 |
| 2023/0084897 | A1* | 3/2023 | Ryoo | G06Q 20/382 |
| | | | | 705/44 |
| 2023/0327876 | A1* | 10/2023 | Kaga | H04L 9/0866 |
| | | | | 713/186 |

FOREIGN PATENT DOCUMENTS

| JP | 2002-112340 A | 4/2002 |
|---|---|---|
| JP | 2003-140765 A | 5/2003 |
| JP | 2007-122599 A | 5/2007 |
| JP | 2007-241371 A | 9/2007 |
| JP | 2015-518228 A | 6/2015 |
| JP | 2020-154496 A | 9/2020 |

* cited by examiner

AUTHENTICATION APPARATUS, SYSTEM, METHOD, AND PROGRAM FOR MULTI-STAGE AUTHENTICATION

This application is a National Stage Entry of PCT/JP2021/044508 filed on Dec. 3, 2021, the contents of all of which are incorporated herein by reference, in their entirety.

FIELD

The present invention relates to an authentication apparatus, a system, a method, and a program.

BACKGROUND

Authentication technology is used in many places of personal belongings such as electronic apparatuses and access (entering/leaving) manages. Also, the authentication technology is utilized for user management and unauthorized login prevention. In an authentication system using authentication technology, there is growing trend towards an authentication apparatus incorporating multi-factor authentication by combining two or more among "knowledge information", "possession information", and "biometric information," as three factors of authentication to improve security strength.

For example, there are authentication systems (for example, see Patent Literatures (PTLs) 1, 3, and 4) that centrally manage two or more authentication factors among biometric information such as face shape, voiceprint and iris; knowledge information such as identification information, password and security question; and possession information such as smart card number, security token and SMS (Short Message Service) authentication, in a single server apparatus, or authentication systems that distributedly manage these factors using a plurality of server apparatuses (for example, see PTLs 2 and 5).

[PTL 1] JP2020-154496A
[PTL 2] JP2015-518228A
[PTL 3] JP2003-140765A
[PTL 4] JP2002-112340A
[PTL 5] JP2002-041469A

SUMMARY

The following analysis is provided by the inventor of the present application.

In the authentication systems described in PTLs 1 to 5, however, since all of the authentication factors required for multi-factor authentication are managed by one or more server apparatuses, in a configuration where other external terminals can access the server apparatuses via a network, all of the authentication factors required for multi-factor authentication, there is a possibility that all of the authentication factors required for multi-factor authentication are leaked to the outside via the network and abused, even if using encryption techniques or hashing techniques etc. to anonymize the authentication factors.

It is a main object of the present invention to provide an authentication apparatus, a system, a method, and a program that can contribute to preventing all of the authentication factors required for multi-factor authentication from leaking to the outside via a network.

An authentication apparatus according to a first aspect comprises: a communication part configured to be able to communicate with a server apparatus that stores at least one piece of common authentication information and at least one piece of first distributed authentication information in association with each other via a network; a read part configured to be able to read information from a user storage medium used by a user that stores at least one piece of common authentication information and at least one piece of second distributed authentication information; an input part configured to be able to receive the first distributed authentication information and the second distributed authentication information by action of the user; and a control part configured to control the communication part, the read part, and the input part, wherein the control part is configured to perform processings of: acquiring the common authentication information and the second distributed authentication information via the read part from the user storage medium; acquiring the second distributed authentication information via the input part by action of the user; authenticating by collating the second distributed authentication information acquired via the read part with the second distributed authentication information acquired via the input part; transmitting the common authentication information acquired via the read part to the server apparatus via the communication part when authenticating all of the second distributed authentication information is completed; acquiring the first distributed authentication information associated with the common authentication information same as the transmitted common authentication information via the communication part from the server apparatus; acquiring the first distributed authentication information via the input part by action of the user; authenticating by collating the first distributed authentication information acquired via the communication part with the first distributed authentication information acquired via the input part; and unlocking a lock when authenticating all of the first distributed authentication information is completed, and wherein the first distributed authentication information is different from the second distributed authentication information.

An authentication system according to a second aspect comprises: a server apparatus configured to store at least one piece of common authentication information and at least one piece of first distributed authentication information in association with each other; a user storage medium used by a user configured to store at least one piece of common authentication information and at least one piece of second distributed authentication information; and the authentication apparatus according to the first aspect.

An authentication method relating to a third aspect is an authentication method of authenticating using an authentication apparatus, wherein the authentication apparatus comprises: a communication part configured to be able to communicate with a server apparatus that stores at least one piece of common authentication information and at least one piece of first distributed authentication information in association with each other via a network; a read part configured to be able to read information from a user storage medium used by a user that stores at least one piece of common authentication information and at least one piece of second distributed authentication information; an input part configured to be able to input the first distributed authentication information and the second distributed authentication information by action of the user; and a control part configured to control the communication part, the read part, and the input part, and wherein the authentication method comprises: acquiring the common authentication information and the second distributed authentication information via the read part from the user storage medium; acquiring the second distributed authentication information via the input part by action of the user; authenticating by collating the second distributed authentication information acquired via the read part with the second distributed authentication information acquired via the input part; transmitting the common authentication information acquired via the read part to the server apparatus via the communication part when authenticating all of the second distributed authentication information is completed; acquiring the first distributed authentication information associated with the common authentication information same as the transmitted common authentication information via the communication part from the server apparatus; acquiring the first distributed authentication information via the input part by action of the user; authenticating by collating the first distributed authentication information acquired via the communication part with the first distributed authentication information acquired via the input part; and unlocking a lock when authenticating all of the first distributed authentication information is completed.

A program according to a fourth aspect is a program causing an authentication apparatus to perform authentication processing, wherein the authentication apparatus comprises: a communication part configured to be able to communicate with a server apparatus that stores at least one piece of common authentication information and at least one piece of first distributed authentication information in association with each other via a network; a read part configured to be able to read information from a user storage medium used by a user that stores at least one piece of common authentication information and at least one piece of second distributed authentication information; an input part configured to be able to receive the first distributed authentication information and the second distributed authentication information by action of the user; and a control part configured to control the communication part, the read part, and the input part, and wherein the program causes the control part to execute processings of: acquiring the common authentication information and the second distributed authentication information via the read part from the user storage medium; acquiring the second distributed authentication information via the input part by action of the user; authenticating by collating the second distributed authentication information acquired via the read part with the second distributed authentication information acquired via the input part; transmitting the common authentication information acquired via the read part to the server apparatus via the communication part when authenticating all of the second distributed authentication information is completed; acquiring the first distributed authentication information associated with the common authentication information same as the transmitted common authentication information via the communication part from the server apparatus; acquiring the first distributed authentication information via the input part by action of the user; authenticating by collating the first distributed authentication information acquired via the communication part with the first distributed authentication information acquired via the input part; and unlocking a lock when authenticating all of the first distributed authentication information is completed.

The program can be recorded on a computer-readable storage medium. The storage medium may be a non-transitory such as a semiconductor memory, a hard disk, a magnetic recording medium and an optical recording medium. Also, in the present disclosure, it is also possible to implement it as a computer program product. The program is input to a computer apparatus from an input device or from outside via a communication interface; is stored in a storage device; causes a processor to drive according to predetermined steps or processings; can cause to display processing results thereof, including an intermediate state via a display device step by step as necessary; or can cause to communicate with outside via a communication interface. The computer apparatus for that purpose typically comprises: for example, a processor; a storage device; an input device; a communication interface; and, if necessary, a display device, that can be connected to each other via a bus.

According to the first to the fourth aspects, it is possible to contribute to preventing all of the authentication factors required for multi-factor authentication from leaking to outside via a network.

EXAMPLE EMBODIMENTS

Figure 1:
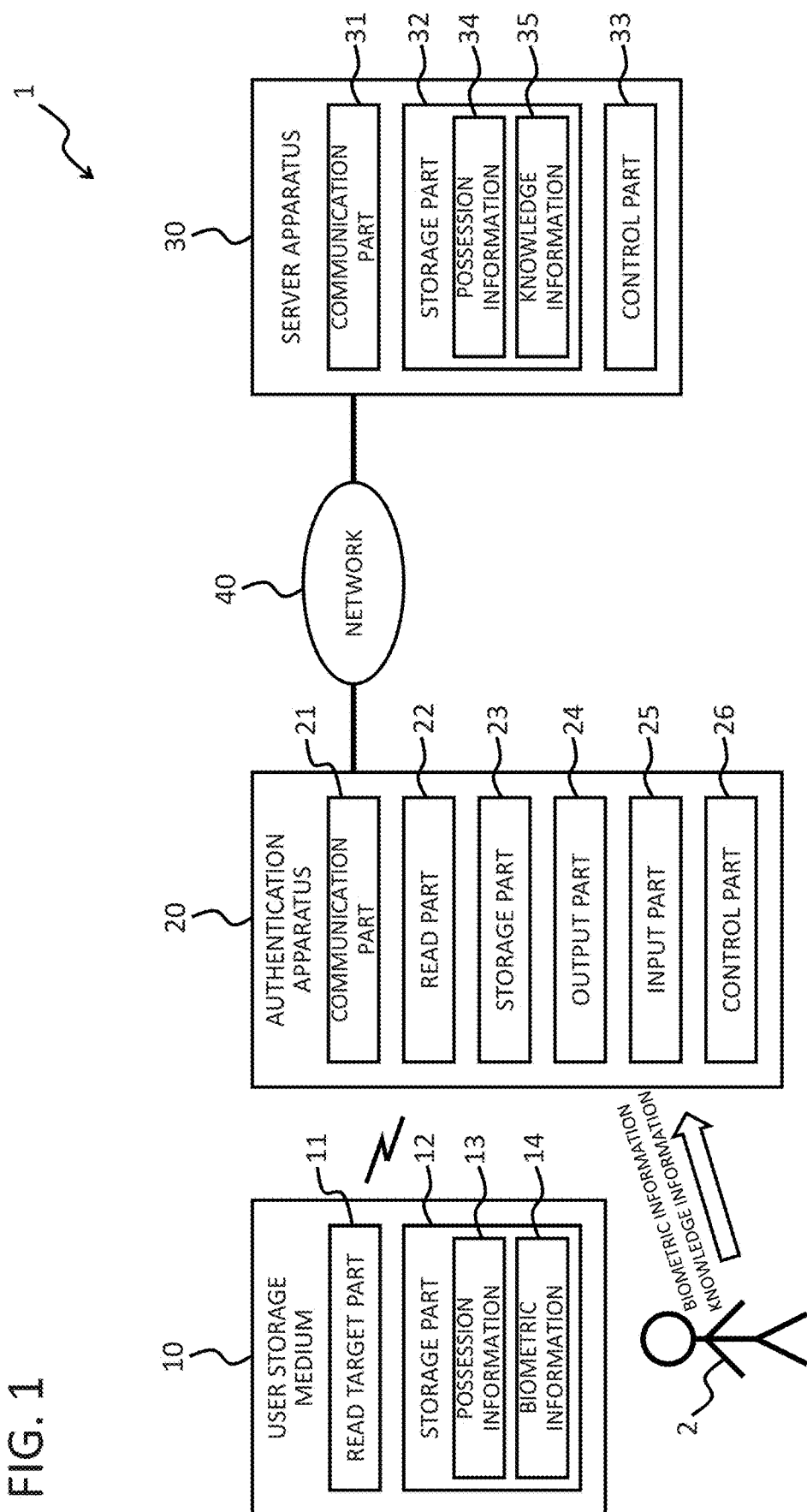
FIG. 1 is a block diagram schematically showing a configuration of an authentication system according to an example embodiment 1.

Hereinafter, example embodiments will be described with reference to drawings. It should be noted that when reference numerals are attached to the drawings in the present application, they are solely for a purpose of helping understanding, and are not intended to limit the example embodiments shown in the drawings. Also, the following example embodiments are only examples, and do not limit the present invention. Further, connection lines between blocks in the drawings and the like referred to in the following description include both bidirectional and unidirectional connections. The unidirectional arrows schematically show flows of main signals (data) and do not exclude bidirectionality. Furthermore, in circuit diagrams, block diagrams, internal configuration diagrams, connection diagrams, etc., disclosed in the present application, an input port and an output port exist at the input end and the output end of each connection line, respectively, although not explicitly shown. The same applies to input/output interface. The program is executed by a computer apparatus, and the computer apparatus comprises, for example, a processor, a storage device, an input apparatus, a communication interface, and a display apparatus as necessary. The computer apparatus is configured to be able to communicate with an internal or external apparatus (including computer) via the communication interface, irrespective of wired or wireless.

Example Embodiment 1

An authentication system according to an example embodiment 1 will be explained using drawings. FIG. 1 is a block diagram schematically showing the configuration of the authentication system according to the example embodiment 1. FIGS. 2 to 7 are block diagrams schematically showing configurations of variations of the authentication system according to the example embodiment 1.

The authentication system 1 is a system that confirms the identity of a user 2 upon using an apparatus or service (see FIG. 1). The authentication system 1 uses a multi-factor authentication method that authenticates users by combining three types of knowledge information, possession information, and biometric information as the three factors of authentication. The authentication system 1 combines one or more knowledge information, one or more possession information, and one or more biometric information to authenticate users by at least two collations. The authentication system 1 uses: at least one common authentication information (corresponding to possession information 13 and 34 in FIG. 1; the possession information 13 and 34 are the same) commonly used in a user storage medium 10 that cannot be connected to a network 40 and a server apparatus 30 that can be connected to the network 40; and at least two distributed authentication information (corresponding to biometric information 14 and knowledge information 35 in FIG. 1) used in a distributed manner by the user storage medium 10 and the server apparatus 30, among knowledge information, possession information, and biometric information, to authenticate by collating the distributed authentication information. The authentication by collating the distributed authentication information in the authentication system 1 is performed with one-to-one authentication. In the authentication system 1 shown in FIG. 1, the authentication apparatus 20 acquires the possession information and the biometric information on the user storage medium 10 of the user 2 and biometric information of the user 2; acquires biometric information of the user 2 own; collates the biometric information; acquires knowledge information corresponding to the possession information from the server device 30 when the biometric information is matching; acquires knowledge information of the user 2; collates the knowledge information; and unlocks when the knowledge information is matching. The authentication system 1 comprises the user storage medium 10, the authentication apparatus 20, the server apparatus 30, and the network 40.

Here, as the possession information, for example, identification information, PIN (Personal Identification Number), smart card number, cash card number, IC (Integrated Circuit) card number, security token, USB (Universal Serial Bus) token, mobile phone number, email address, one-time password, FIDO (Fast Identity Online) authentication confirmation code, SMS (Short Message Service) authentication confirmation code, email authentication confirmation code, smartphone application authentication confirmation code, Bluetooth (registered trademark) Smart authentication confirmation code, voice call, cipher table authentication confirmation code, etc. are used.

Also, as the knowledge information, for example, password, matrix authentication, answer to secret question, personal identification number, etc. are used.

Further, as the biometric information, for example, face shape, fingerprint, iris, vein, voiceprint, handwriting, retina, palm shape, ear shape, keystroke authentication, lip movement, blinking, etc. are used.

The user storage medium 10 is a storage medium used (or possessed) by the user 2 (see FIG. 1). As the user storage medium 10, a medium comprising a material or structure body capable of storing data, such as magnetic, optical, magneto-optical and shape pattern can be used. As the user storage medium 10, for example, a card, a microchip, a memory stick, etc., comprising a short-range wireless communication function part (antenna, interface, etc.) such as an IC (Integrated Circuit) tag, an RF (Radio Frequency) tag, a passive tag, an active tag and a semi-active tag, a terminal part, or connector; and having a tag embedded information, can be used. As one example, the user storage medium 10 can be configured to comprise a read target part 11 and a storage part 12.

The read target part 11 is a function part that reads information in the storage part 12 by receiving action (physical action, electrical action, magnetic action, etc.) from a read part 22 of the authentication apparatus 20 to provide (for example, transmit) the information to the read part 22 (see FIG. 1). The read target part 11 is electrically connected to the storage part 12.

The storage part 12 is a function part that stores predetermined authentication information (see FIG. 1). The storage part 12 stores one or more pieces of common authentication information (one piece of possession information 13 in FIG. 1) and one or more pieces of distributed authentication information (one piece of biometric information 14 in FIG. 1). The common authentication information (the possession information 13 in FIG. 1) stored in the storage part 12 is common (same) as the common authentication information (the possession information 34 in FIG. 1) stored in a storage part 32 of the server apparatus 30. The distributed authentication information (the biometric information 14 in FIG. 1) stored in the storage part 12 is different from the distributed authentication information (the knowledge information 35 in FIG. 1) stored in the storage part 32 of the server apparatus 30.

Figure 2:
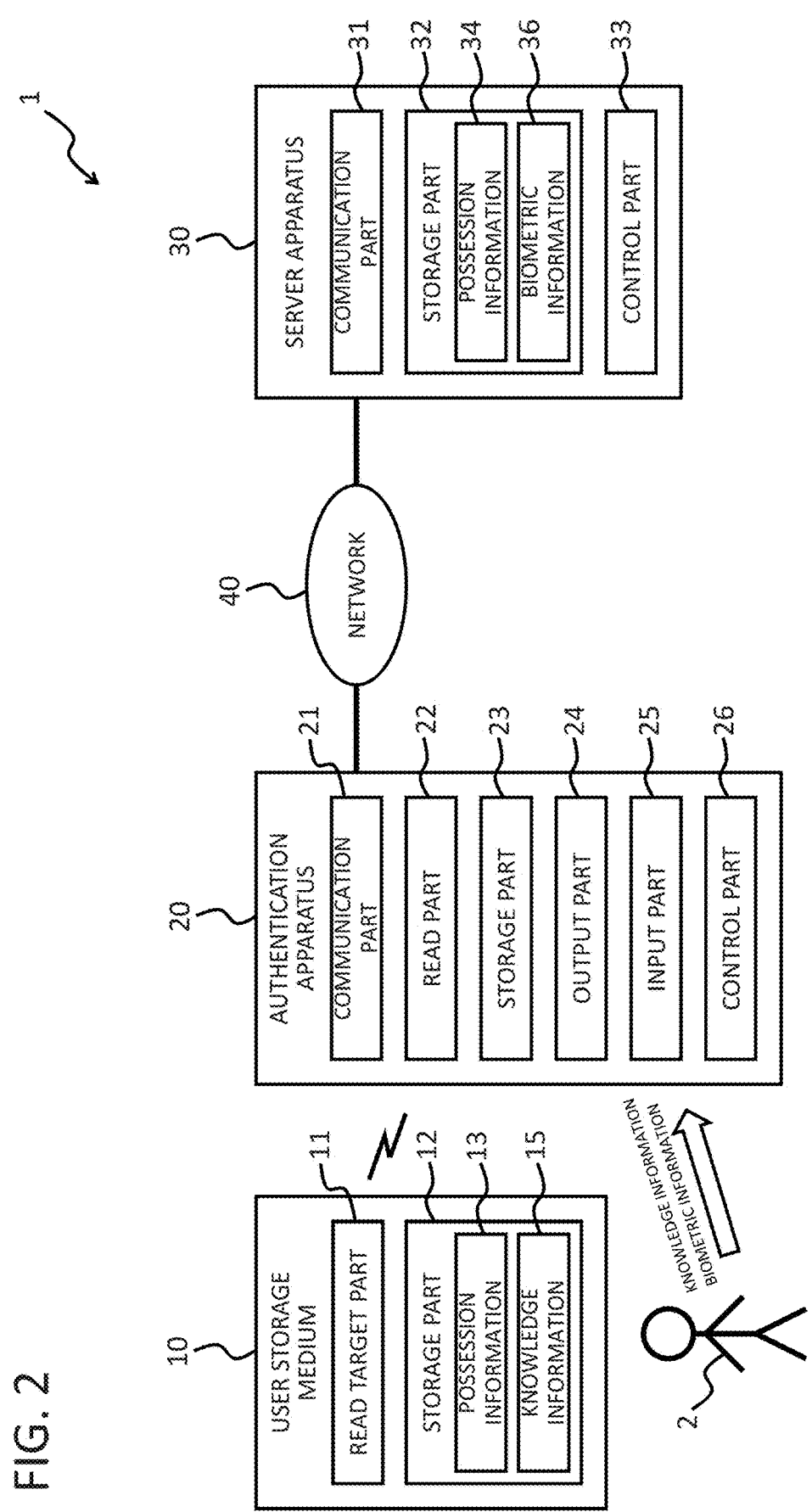
FIG. 2 is a block diagram schematically showing a configuration of a first variation of the authentication system according to the example embodiment 1.
Figure 3:
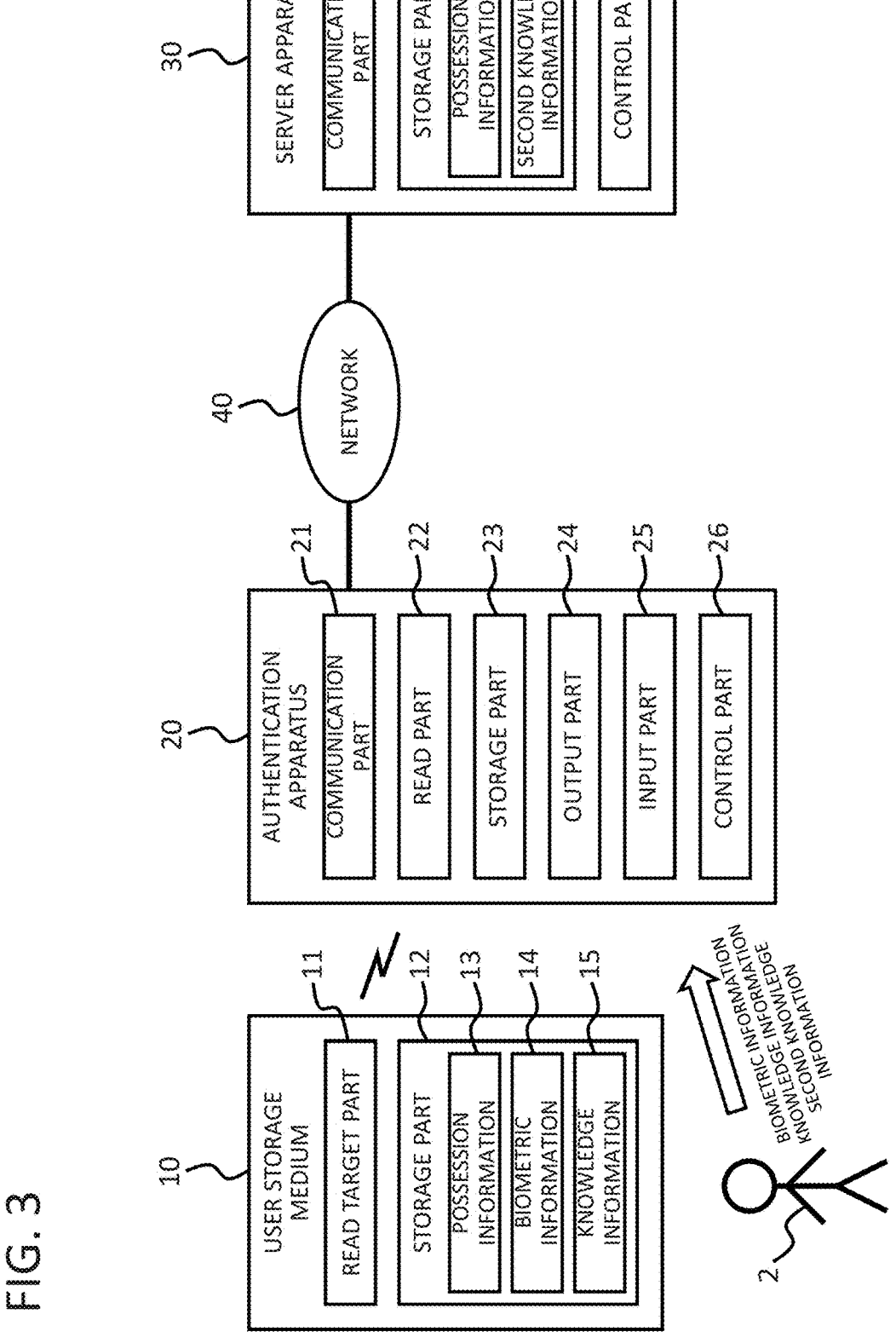
FIG. 3 is a block diagram schematically showing a configuration of a second variation of the authentication system according to the example embodiment 1.
Figure 4:
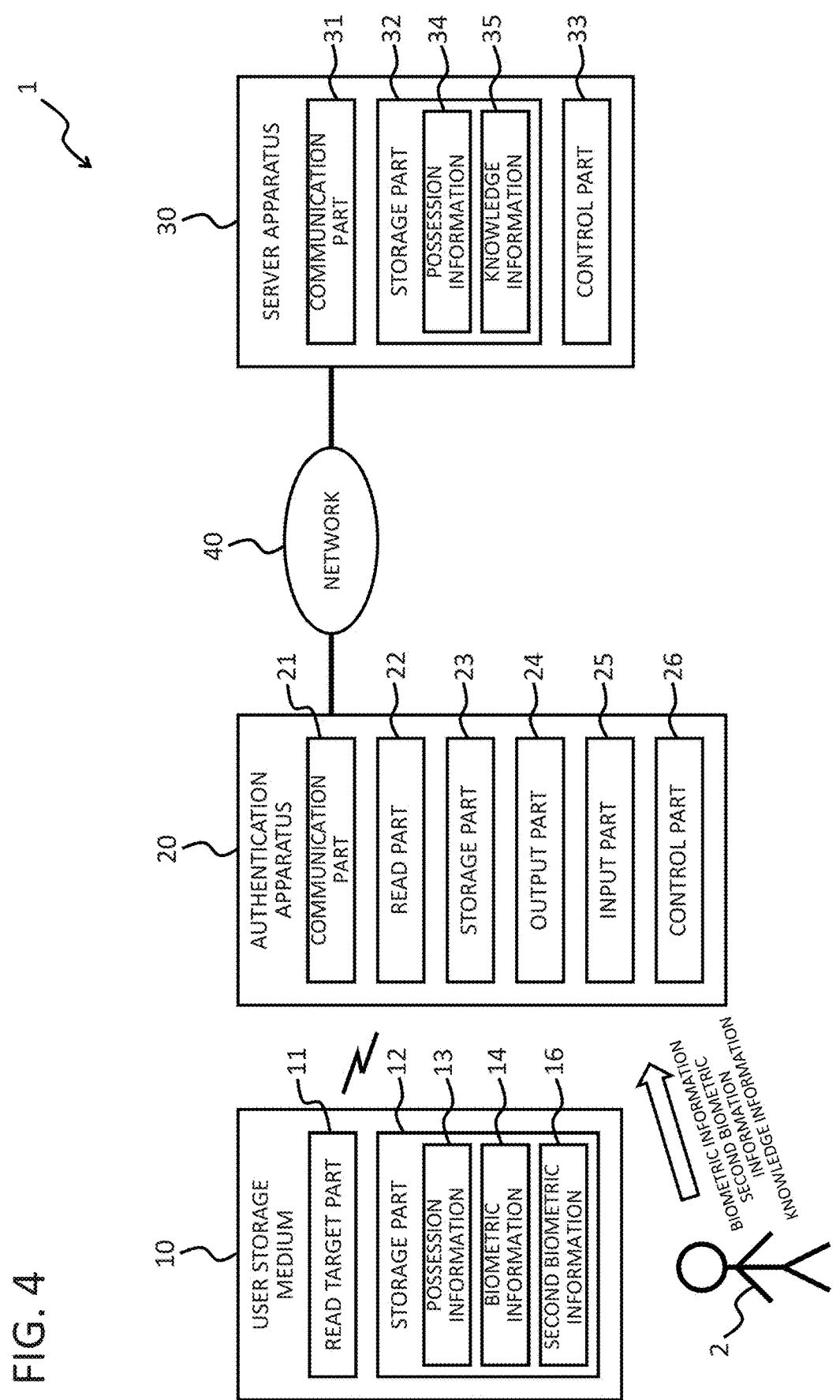
FIG. 4 is a block diagram schematically showing a configuration of a third variation of the authentication system according to the example embodiment 1.
Figure 5:
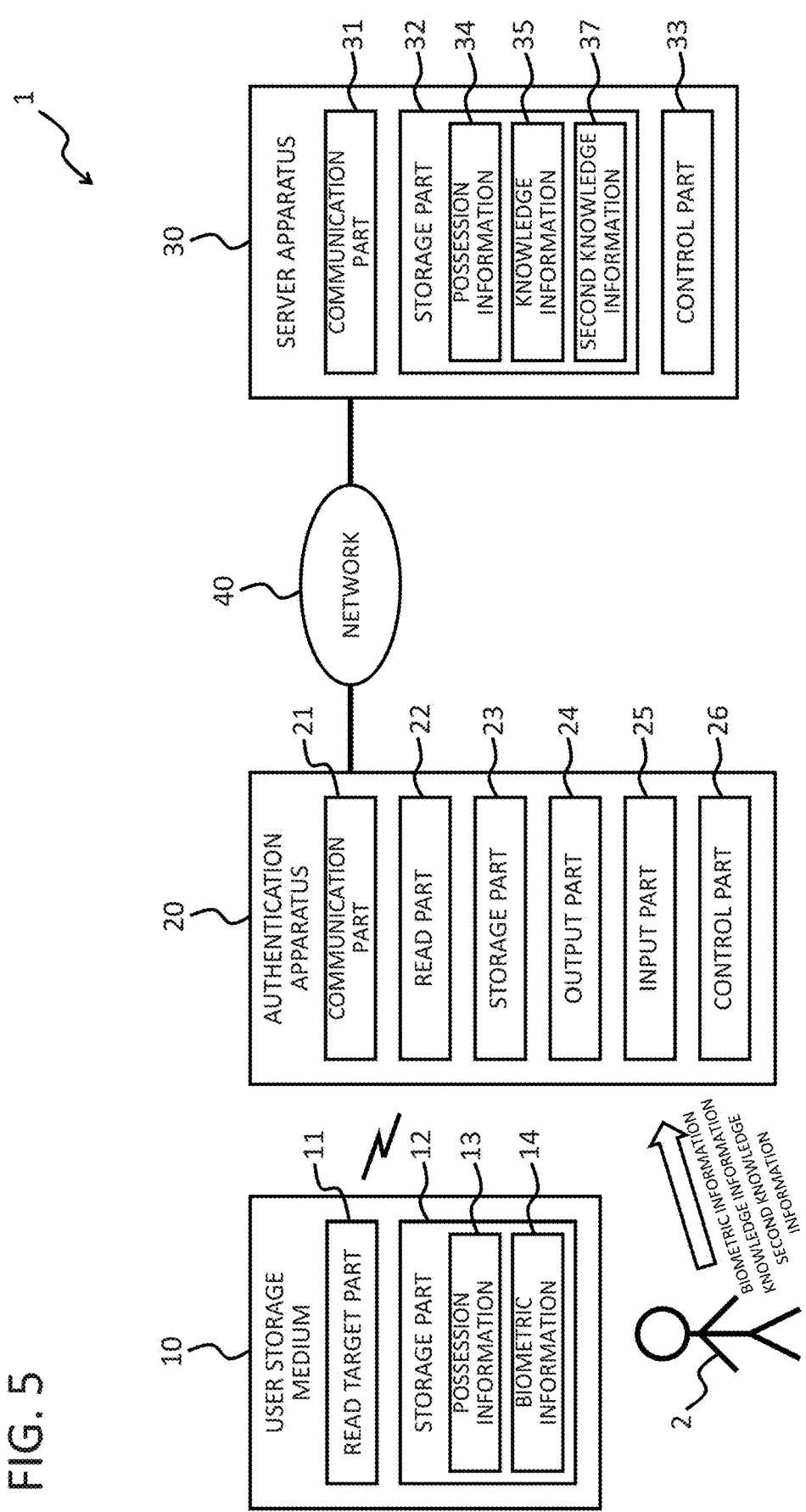
FIG. 5 is a block diagram schematically showing a configuration of a fourth variation of the authentication system according to the example embodiment 1.
Figure 6:
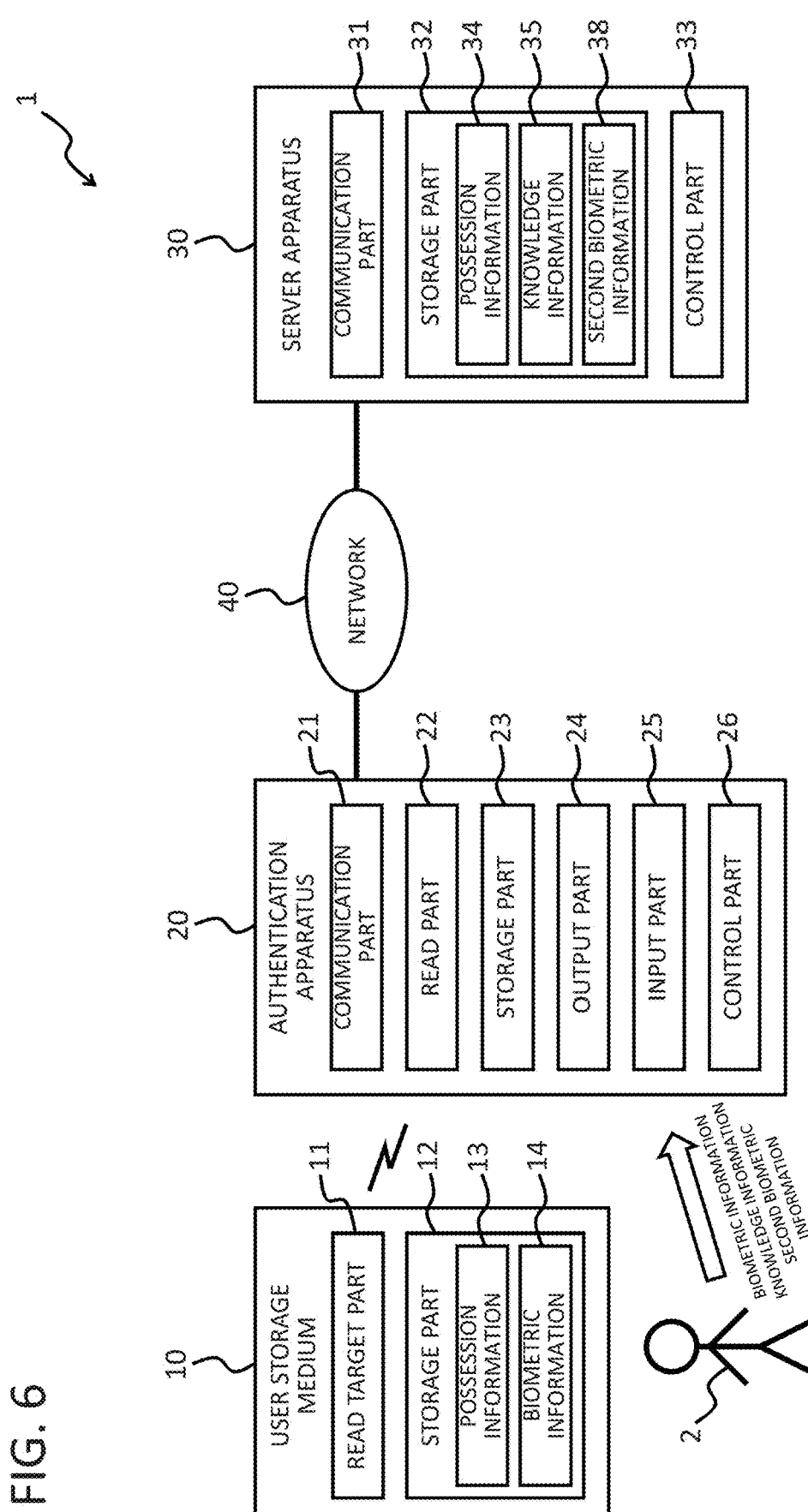
FIG. 6 is a block diagram schematically showing a configuration of a fifth variation of the authentication system according to the example embodiment 1.

Note that the authentication information stored in the storage part 12 is not limited to a combination of the possession information 13 and the biometric information 14 as shown in FIGS. 1, 5, and 6; may also be a combination of the possession information 13 and knowledge information 15 as shown in FIG. 2, a combination of all the three types of authentication factors (the possession information 13, the biometric information 14, and the knowledge information 15) as shown in FIG. 3, or a combination of a plurality of different authentication factors of the same type (the biometric information 14 and second biometric information 16 or knowledge information and second knowledge information are possible) as shown in FIG. 4.

The authentication apparatus 20 is an apparatus that confirms the identity of the user 2 upon using an apparatus or service (see FIG. 1). The authentication apparatus 20 comprises a communication part 21, a read part 22, a storage part 23, an output part 24, an input part 25, and a control part 26.

The communication part 21 is a function part that performs information communication (wired-communication or wireless-communication) (see FIG. 1). The communication part 21 is communicably connected to the network 40. The communication part 21 performs communication under control of the control part 26. As the communication part 21, for example, a wired communication interface or wireless communication interface may be used. The communication part 21 can transmit common authentication information (possession information derived from the possession information 13 on the user storage medium 10 in FIG. 1) to the server apparatus 30. The communication part 21 can receive distributed authentication information such as the knowledge information 35 from the server apparatus 30.

The read part 22 is a function part that reads information from the user storage medium 10 (see FIG. 1). The read part 22 is not able to communicate with the network 40. The read part 22 reads information under control of the control part 26. As the read part 22, for example, a short-range wireless communication reader such as an IC tag reader, an RF tag reader, a passive tag reader, an active tag reader and a semi-active tag reader; a wired communication port such as a USB port, a USB Type-C port and a Lightning port; a magnetic reader; etc. The read part 22 can read and receive common authentication information (the possession information 13 in FIG. 1) and distributed authentication information (the biometric information 14 in FIG. 1) from the storage part 12 of the user storage medium 10 by applying action (physical action, electrical action, mechanical action, etc.) to the read target part 11 of the user storage medium 10.

The storage part 23 is a function part that stores various types of information (data, program, etc.) (see FIG. 1). As the storage part 23, for example, storage devices such as a RAM (Random Access Memory), an HDD (Hard Disk Drive) and an SSD (Solid State Drive) can be used. The storage part 23 writes and reads information under control of the control part 26. The storage part 23 can store information from the user storage medium 10 and the server apparatus 30. The storage part 23 can store data processed by the control part 26. The common authentication information (the possession information derived from the possession information 13 on the user storage medium 10 in FIG. 1) stored in the storage part 23 can be transmitted to the server apparatus 30. The distributed authentication information (biometric information derived from the biometric information 14 on the user storage medium 10 in FIG. 1) stored in the storage part 23 is not transmitted to the server apparatus 30. The common authentication information and the distributed authentication information stored in the storage part 23 are erased after authentication processing.

The output part 24 is a function part that outputs information (display, audio output, etc.) (see FIG. 1). The output part 24 outputs information under control of the control part 26. As the output part 24, for example, a display device such as a liquid crystal display and an organic EL (Electro Luminescence) display, a speaker, etc. may be used.

The input part 25 is a function part that inputs (receives) information (see FIG. 1). The input part 25 receives information obtained by operation of the user 2 and biometric information obtained by reading a biological feature of the user 2 under control of the control part 26. As the input part 25, for example, a touch panel, a keyboard, a mouse, a microphone, a camera, a three-dimensional sensor, a fingerprint sensor, a vein sensor, an iris sensor, a retinal scanner, a gesture recognition sensor, etc. can be used. The input part 25 comprises an analysis function as required in case that analysis (for example, image analysis) is necessary for reading biometric information.

The control part 26 is a function part that controls the communication part 21, the read part 22, the storage part 23, the output part 24, and the input part 25 (see FIG. 1). As the control part 26, for example, a processor such as a CPU (Central Processing Unit), an MPU (Micro Processor Unit) and a GPU (Graphics Processing Unit) can be used. The control part 26 can perform predetermined information processing described in a predetermined program by executing the program stored in the storage part 23. The operations of the control part 26 will be described in detail later.

The server apparatus 30 is an apparatus that performs a service of providing authentication factors to the authentication apparatus 20 (see FIG. 1). The server apparatus 30 comprises a communication part 31, a storage part 32, and a control part 33.

The communication part 31 is a function part that performs information communication (wired-communication or wireless-communication) (see FIG. 1). The communication part 31 is communicably connected to the network 40. The communication part 31 performs communication under control of the control part 33. As the communication part 31, for example, a wired communication interface or wireless communication interface may be used. The communication part 31 can receive the common authentication information (the possession information derived from the possession information 13 on the user storage medium 10 in FIG. 1) from the authentication apparatus 20. The communication part 31 can transmit the distributed authentication information (the knowledge information 35 in FIG. 1) associated with the common authentication information (the possession information 34 in FIG. 1) same as the received common authentication information to the authentication apparatus 20.

The storage part 32 is a function part that stores one or more pieces of common authentication information (one piece of possession information 34 in FIG. 1) and one or more pieces of distributed authentication information (one knowledge information 35 in FIG. 1) in association with each other (see FIG. 1). The common authentication information (the possession information 34 in FIG. 1) stored in the storage part 32 is common (same) as the common authentication information (the possession information 13 in FIG. 1) stored in the storage part 12 of the user storage medium 10. The distributed authentication information (the knowledge information 35 in FIG. 1) stored in the storage part 32 is different from the distributed authentication information (the biometric information 14 in FIG. 1) stored in the storage part 12 of the user storage medium 10.

Note that the authentication information stored in the storage part 32 is not limited to a combination of the possession information 34 and the knowledge information 35 as shown in FIGS. 1 and 4, and may also be a combination of the possession information 34 and biometric information 36 as shown in FIG. 2, a combination of the possession information 34 and second knowledge information 37 (different from the knowledge information 15 and 35) as shown in FIG. 3, a combination of the possession information 34 and a plurality of different authentication factors of the same type (the knowledge information 35 and the second knowledge information 37 or biometric information and second biometric information) as shown in FIG. 5, or a combination of all the three types of authentication factors (the possession information 34, the knowledge information 35, and second biometric information 38 (different from the biometric information 14 and 36)) as shown in FIG. 6.

The control part 33 is a function part that controls the communication part 31 and the storage part 32 (see FIG. 1). As the control part 33, for example, a processor such as a CPU, an MPU and a GPU can be used. The control part 33 can perform predetermined information processing described in a predetermined program by executing the program stored in the storage part 32. The control part 33 performs processing so as to read the distributed authentication information (the knowledge information 35 in FIG. 1) associated with the common authentication information (the possession information 34 in FIG. 1) same as the common authentication information received by the communication part 31 from the storage part 32 and transmit the distributed authentication information to the authentication apparatus 20 via the communication part 31.

The network 40 is a wired or wireless communication network that communicably connects between the authentication apparatus 20 and the server apparatus 30 (see FIG. 1). As the network 40, for example, a communication network such as a PAN (Personal Area Network), a LAN (Local Area Network), a MAN (Metropolitan Area Network), a WAN (Wide Area Network) and a GAN (Global Area Network) can be used.

Figure 7:
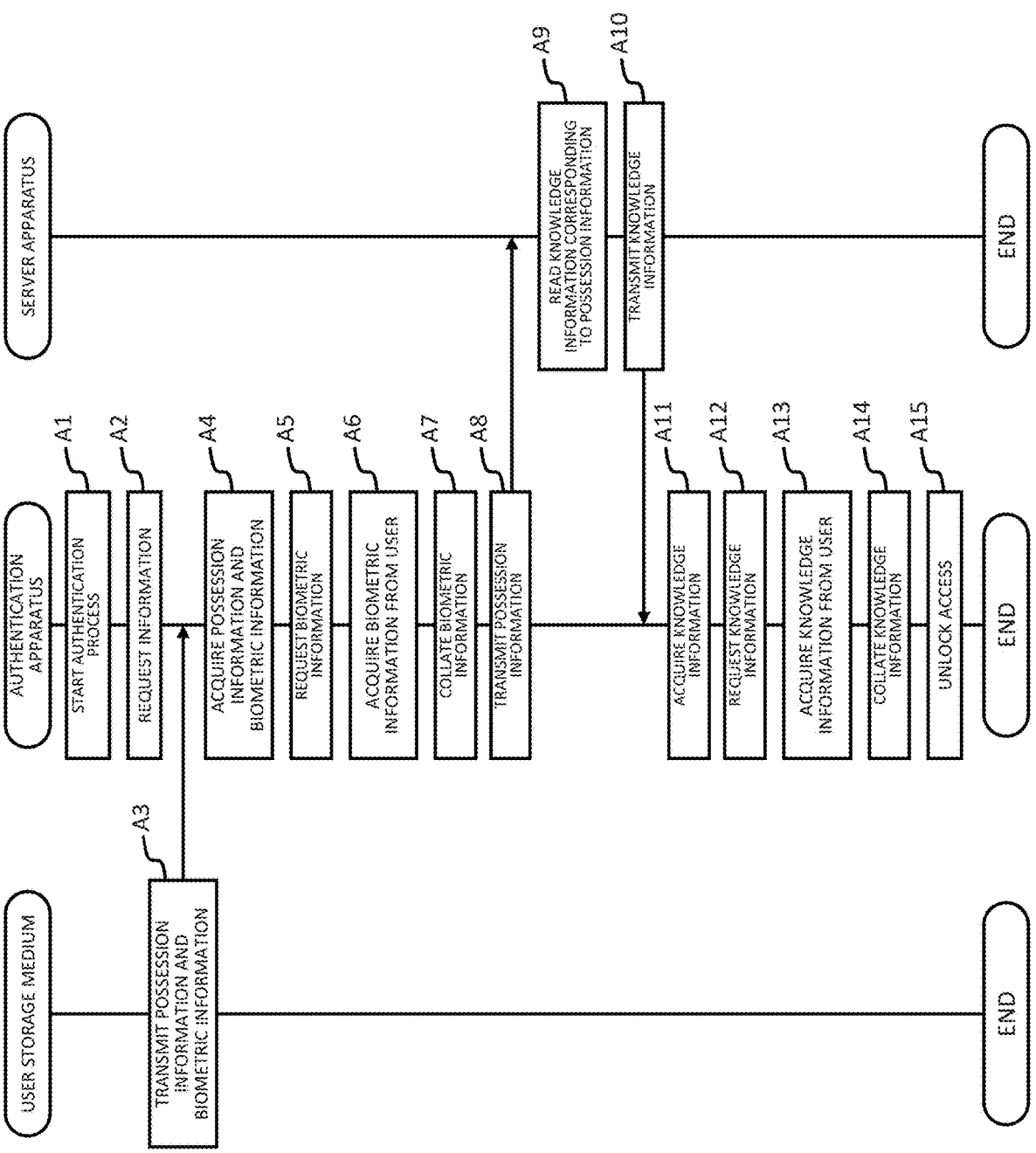
FIG. 7 is a flowchart diagram schematically showing operations of the authentication system according to the example embodiment 1.

Next, operations of the authentication system according to the example embodiment 1 will be explained using drawings. FIG. 7 is a flowchart diagram schematically showing operations of the authentication system according to the example embodiment 1. Please see FIG. 1 as to the configuration of authentication system.

First, the control part 26 of the authentication apparatus 20 starts an authentication process when the input part 25 receives any operation by the user 2 (step A1).

Next, the control part 26 of the authentication apparatus 20 outputs (displays, audio-outputs, etc.) an information request guide from the output part 24 to request information (the possession information 13 and the biometric information 14 in FIG. 1) on the user storage medium 10 from the user 2 (step A2).

Next, the user 2 brings (for example, holds up in case of wireless communication) closer or connects (for example, connector-connects or terminal-connects in case of wired communication) the read target part 11 of the user storage medium 10 to the read part 22 of the authentication apparatus 20, thereby the user storage medium 10 transmits the possession information 13 and the biometric information 14 of the storage part 12 to the authentication apparatus 20 via the read target part 11 (step A3).

Next, the control part 26 of the authentication apparatus 20 acquires the possession information 13 and the biometric information 14 from the user storage medium 10 via the read part 22 (step A4).

Next, the control part 26 of the authentication apparatus 20 outputs (displays, audio-outputs, etc.) a biometric information request guide from the output part 24 to request biometric information from the user 2 (step A5).

Next, the control part 26 of the authentication apparatus 20 acquires the biometric information (biometric information of the user 2 own) inputted to the input part 25 by action (action required to input biometric information) of the user 2 (step A6).

Next, the control part 26 of the authentication apparatus 20 performs authentication (one-to-one authentication) by collating the biometric information 14 acquired from the read part 22 and the biometric information (biometric information of the user 2 own) acquired from the input part 25 as authentication of the first distributed authentication information (step A7). In case of the biometric information not matching, biometric information is requested from the user 2 again. In case of the biometric information ultimately not matching, the process ends. Also, in case of completing authentication related to the biometric information (biometric information is matching), the biometric information is erased.

Next, the control part 26 of the authentication apparatus 20 transmits the possession information 13 acquired from read part 22 to the server apparatus 30 via the communication part 21 and the network 40 (step A8).

Next, the control part 33 of the server apparatus 30 receives the possession information 13 from the authentication apparatus 20 via the communication part 31; searches the possession information 34 which is same as the received possession information 13 in the storage part 32; and reads the knowledge information 35 associated with the searched possession information 34 from the storage part 32 (step A9).

Next, the control part 33 of the server apparatus 30 transmits the read knowledge information 35 to the authentication apparatus 20 via the communication part 31 and the network 40 (step A10).

Next, the control part 26 of the authentication apparatus 20 acquires the knowledge information 35 from the server apparatus 30 via the communication part 21 (step A11).

Next, the control part 26 of the authentication apparatus 20 outputs (displays, audio-outputs, etc.) a knowledge information request guide from the output part 24 to request knowledge information from the user 2 (step A12).

Next, the control part 26 of the authentication apparatus 20 acquires the knowledge information inputted to the input part 25 by action (action required to input knowledge information) of the user 2 (step A13).

Next, the control part 26 of the authentication apparatus 20 performs authentication (one-to-one authentication) by collating the knowledge information 35 acquired from the communication part 21 and the knowledge information acquired from the input part 25 as authentication of second distributed authentication information (step A14). In case of the knowledge information not matching, knowledge information is requested from the user 2 again. In case of the knowledge data ultimately not matching, the process ends. Also, in case of completing authentication related to the knowledge information, the knowledge information is erased.

Next, the control part 26 of the authentication apparatus 20 unlocks access to an apparatus or service (step A15) and then ends the process.

Note that the operations shown in FIG. 7 corresponds to that in the configuration of FIG. 1, but operation can be modified according to the configurations shown in FIGS. 2 to 6.

According to the example embodiment 1, since a plurality of different authentication factors (the biometric information 14 and the knowledge information 35 in FIG. 1) required for multi-factor authentication are distributed and held by the user storage medium 10 incapable of connecting to the network 40 and the server apparatus 30 capable of connecting to the network 40, it is possible to contribute to preventing all of the authentication factors required for multi-factor authentication from leaking to the outside via the network 40. That is, by not storing all of the plurality of authentication factors required for multi-factor authentication in one or more server apparatuses, it is possible to improve security strength. In other words, even if the authentication factors (the possession information 13 and the knowledge information 35 in FIG. 1) are leaked due to unauthorized access to the server apparatus 30, it is possible to prevent login at the authentication apparatus 20. Also, even if the authentication factors (the possession information 13 and the biometric information 14 in FIG. 1) leak by losing the user storage medium 10 and picked up it by someone else, it is possible to prevent login at the authentication apparatus 20.

Also, according to the example embodiment 1, since the authentication apparatus 20 performs an authentication process on a one-to-one basis, it is possible to reduce the number of internal processing steps, shorten the authentication time, and improve the authentication accuracy, as compared to authentication systems that perform one-to-multiple (many) authentication for each authentication factor.

Example Embodiment 2

Figure 8:
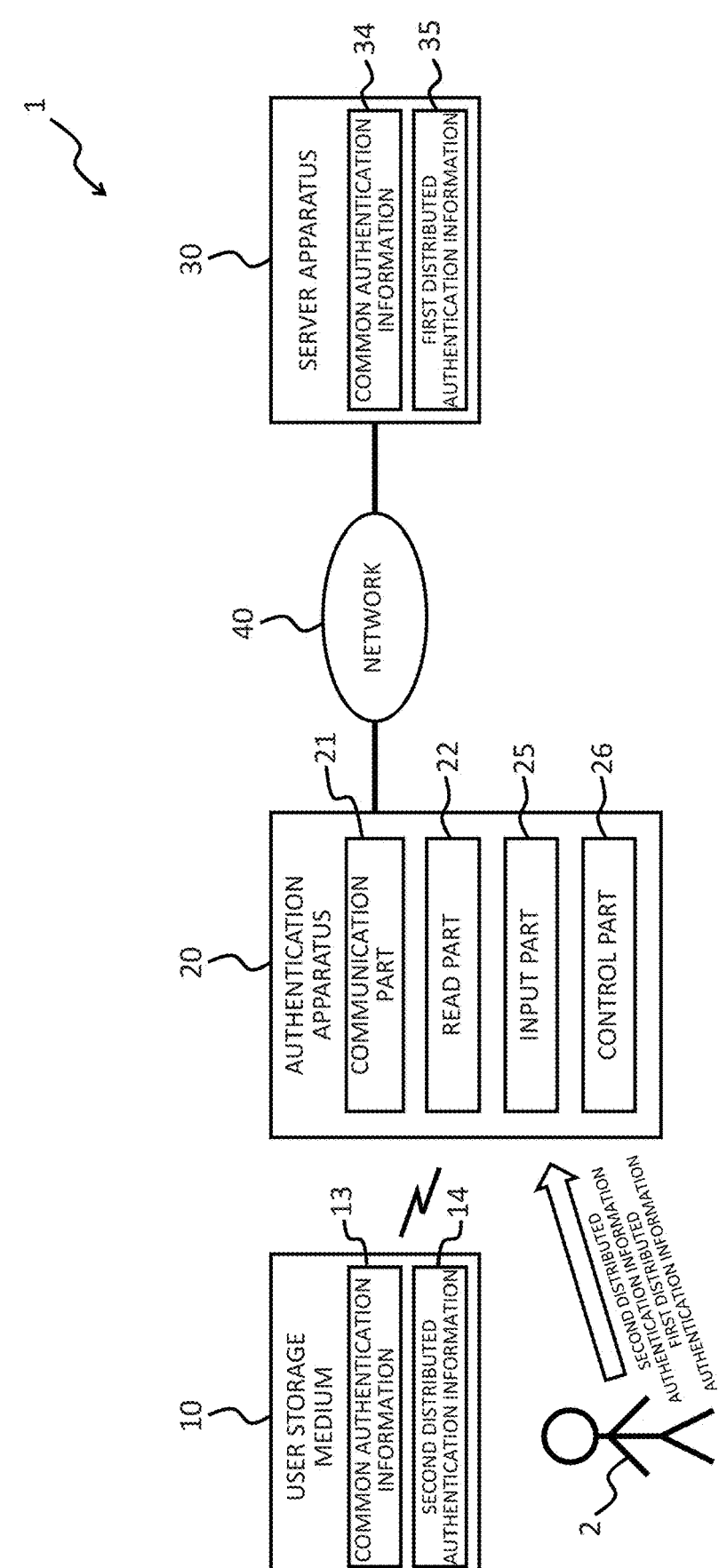
FIG. 8 is a block diagram schematically showing a configuration of an authentication apparatus according to an example embodiment 2.

An authentication apparatus according to an example embodiment 2 will be explained using drawings. FIG. 8 is a block diagram schematically showing a configuration of the authentication apparatus according to the example embodiment 2.

The authentication apparatus 20 is an apparatus that confirms the identity of the user 2. The authentication apparatus 20 comprises a communication part 21, a read part 22, an input part 25, and a control part 26.

The communication part 21 is configured to be able to communicate via the network 40 with the server apparatus 30 that stores at least one piece of common authentication information 34 and at least one piece of first distributed authentication information 35 in association with each other.

The read part 22 is configured to be able to read information from the user storage medium 10 used by the user 2 that stores at least one piece of common authentication information 13 and at least one piece of second distributed authentication information 14.

The input part 25 is configured to be able to input (receive) the first distributed authentication information and the second distributed authentication information by action of the user 2. The first distributed authentication information is different from the second distributed authentication information.

The control part 26 is configured to control the communication part 21, the read part 22, and the input part 25. The control part 26 performs a process of acquiring the common authentication information 13 and the second distributed authentication information 14 from the user storage medium 10 via the read part 22. The control part 26 performs a process of acquiring the second distributed authentication information via the input part 25 by action of the user 2. The control part 26 performs a process of authenticating by collating the second distributed authentication information 14 acquired via the read part 22 with the second distributed authentication information acquired via the input part 25. The control part 26 performs a process of transmitting the common authentication information 13 acquired via the read part 22 to the server apparatus 30 via the communication part 21 when authenticating all of the second distributed authentication information is completed. The control part 26 performs a process of acquiring the first distributed authentication information 35 associated with the common authentication information 34 same as the transmitted common authentication information 13 from the server apparatus 30 via the communication part 21. The control part 26 performs a process of acquiring the first distributed authentication information via the input part 25 by action of the user 2. The control part 26 performs a process of authenticating by collating the first distributed authentication information 35 acquired via the communication part 21 with the first distributed authentication information acquired via the input part 25. The control part 26 performs a process of unlocking the lock when authenticating all of the first distributed authentication information is completed.

According to the example embodiment 2, since a plurality of different authentication factors (the first distributed authentication information 35 and the second distributed authentication information 14 in FIG. 8) required for multi-factor authentication are distributed and held by the user storage medium 10 incapable of connecting to the network 40 and the server apparatus 30 capable of connecting to the network 40, it is possible to contribute to preventing all of the authentication factors required for multi-factor authentication from leaking to the outside via the network 40.

Figure 9:
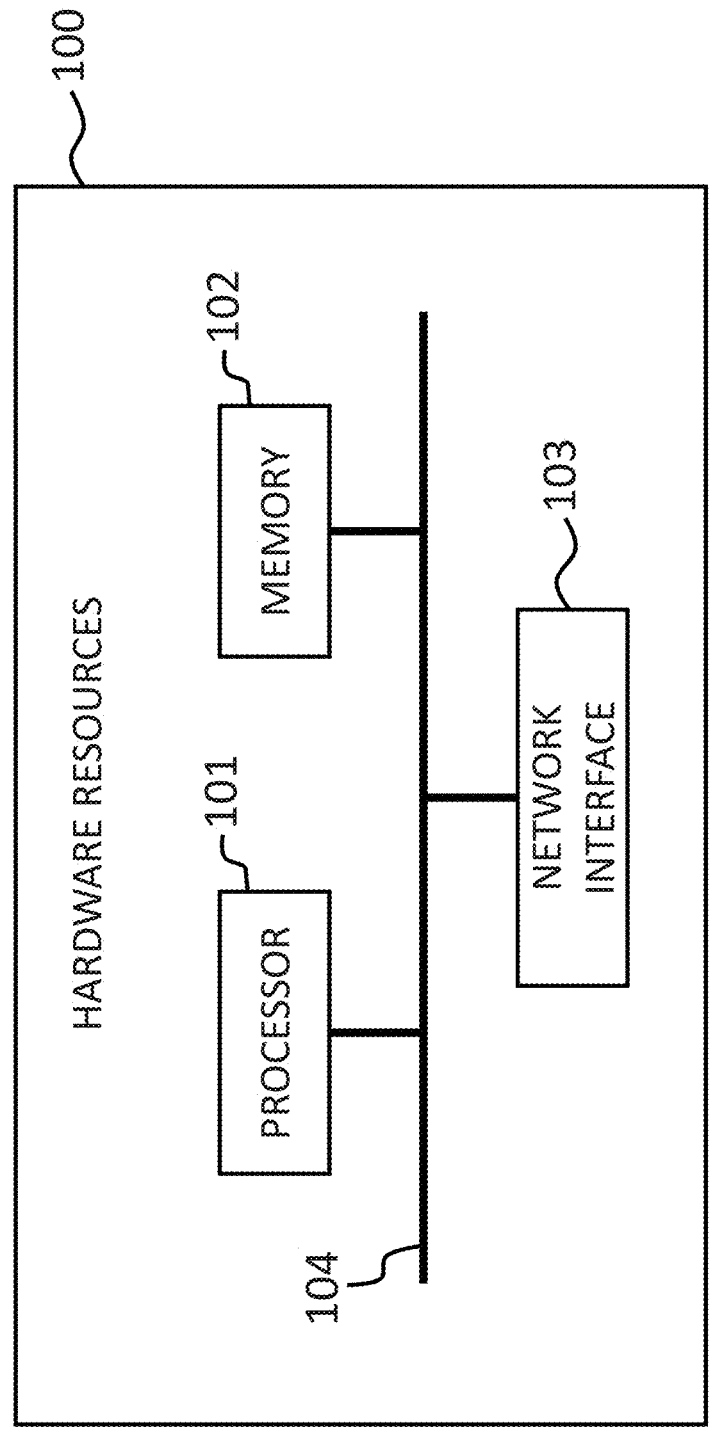
FIG. 9 is a block diagram schematically showing a configuration of hardware resources.

The authentication apparatuses and the server apparatuses relating to the example embodiments 1 and 2 can be configured by so-called hardware resources (information processing apparatus, computer) and may use a configuration shown exemplarily in FIG. 9. For example, hardware resources 100 comprise a processor 101, a memory 102, and a network interface 103, which are connected to each other by an internal bus 104

The configuration shown in FIG. 9 is not intended to limit the hardware configuration of the hardware resources 100. The hardware resource 100 may include hardware (for example, an input/output interface) that is not shown. Alternatively, the number of units such as the processors 101 included in the apparatus is not limited to the example shown in FIG. 9; for example, a plurality of processors 101 may be included in the hardware resources 100. As the processor 101, for example, a CPU (Central Processing part), an MPU (Micro Processor Unit), a GPU (Graphics Processing part), etc. can be used.

As the memory 102, for example, RAM (Random Access Memory), ROM (Read Only Memory), HDD (Hard Disk Drive), SSD (Solid State Drive), etc. can be used.

As the network interface 103, for example, a LAN (Local Area Network) card, a network adaptor, a network interface card, etc. can be used.

The functions of the hardware resources 100 are realized by the processing modules described above. The processing module is realized for example, by the processor 101 executing a program stored in the memory 102. Also, the program can be updated by downloading over a network or by using a storage medium storing the program. Further, the processing module may be realized by a semiconductor chip. That is, the functions performed by the processing module may be able to be realized by executing software on some kind of hardware A part or all of the above example embodiments may be described as the following Modes but is not limited to the following.

[Mode 1]

An authentication apparatus comprising:

a communication part configured to be able to communicate via a network with a server apparatus that stores at least one piece of common authentication information and at least one piece of first distributed authentication information in association with each other;

a read part configured to be able to read information from a user storage medium used by a user that stores at least one piece of common authentication information and at least one piece of second distributed authentication information;

an input part configured to be able to receive the first distributed authentication information and the second distributed authentication information by action of the user; and a control part configured to control the communication part, the read part, and the input part, wherein the control part is configured to perform processings of:

acquiring the common authentication information and the second distributed authentication information via the read part from the user storage medium;

acquiring the second distributed authentication information via the input part by action of the user;

authenticating by collating the second distributed authentication information acquired via the read part with the second distributed authentication information acquired via the input part;

transmitting the common authentication information acquired via the read part to the server apparatus via the communication part when authenticating all of the second distributed authentication information is completed;

acquiring from the server apparatus via the communication part the first distributed authentication information associated with the common authentication information as the same transmitted common authentication information;

acquiring the first distributed authentication information via the input part by action of the user;

authenticating by collating the first distributed authentication information acquired via the communication part with the first distributed authentication information acquired via the input part; and unlocking a lock when authenticating all of the first distributed authentication information is completed, and wherein the first distributed authentication information is different from the second distributed authentication information.

[Mode 2]

The authentication apparatus according to Mode 1, wherein the common authentication information is possession information, the first distributed authentication information is knowledge information, and the second distributed authentication information is biometric information.

[Mode 3]

The authentication apparatus according to Mode 1, wherein the common authentication information is possession information, the first distributed authentication information is biometric information, and the second distributed authentication information is knowledge information.

[Mode 4]

The authentication apparatus according to Mode 1, wherein the common authentication information is possession information, the first distributed authentication information is first biometric information and/or first knowledge information, and the second distributed authentication information is second biometric information and/or second knowledge information.

[Mode 5]

The authentication apparatus according to any one of Modes 1 to 4, wherein the read part is configured to be able to perform wired or wireless communication with the user storage medium without intervening the network.

[Mode 6]

The authentication apparatus according to any one of Modes 1 to 5, wherein the control part is configured to further perform a process of erasing all of the second distributed authentication information when authenticating all of the second distributed authentication information is completed.

[Mode 7]

The authentication apparatus according to any one of Modes 1 to 6, wherein the control part is configured to further perform a process of erasing all of the first distributed authentication information when authenticating all of the first distributed authentication information is completed.

[Mode 8]

An authentication system comprising:

a server apparatus configured to store at least one piece of common authentication information and at least one piece of first distributed authentication information in association with each other;

a user storage medium used by a user configured to store at least one piece of common authentication information and at least one piece of second distributed authentication information; and the authentication apparatus according to any one of Modes 1 to 7.

[Mode 9]

An authentication method for authenticating using an authentication apparatus comprising:

a communication part configured to be able to communicate via a network with a server apparatus that stores at least one piece of common authentication information and at least one piece of first distributed authentication information in association with each other;

a read part configured to be able to read information from a user storage medium used by a user that stores at least one piece of common authentication information and at least one piece of second distributed authentication information;

an input part configured to be able to receive the first distributed authentication information and the second distributed authentication information by action of the user; and a control part configured to control the communication part, the read part, and the input part, wherein the authentication method comprises:

acquiring the common authentication information and the second distributed authentication information via the read part from the user storage medium;

acquiring the second distributed authentication information via the input part by action of the user;

authenticating by collating the second distributed authentication information acquired via the read part with the second distributed authentication information acquired via the input part;

transmitting the common authentication information acquired via the read part to the server apparatus via the communication part when authenticating all of the second distributed authentication information is completed;

acquiring from the server apparatus via the communication part the first distributed authentication information associated with the common authentication information same as the transmitted common authentication information;

acquiring the first distributed authentication information via the input part by action of the user;

authenticating by collating the first distributed authentication information acquired via the communication part with the first distributed authentication information acquired via the input part; and unlocking a lock when authenticating all of the first distributed authentication information is completed.

[Mode 10]

A program causing an authentication apparatus to perform authentication processing, wherein the authentication apparatus comprises:

a communication part configured to be able to communicate via a network with a server apparatus that stores at least one piece of common authentication information and at least one piece of first distributed authentication information in association with each other;

a read part configured to be able to read information from a user storage medium used by a user that stores at least one piece of common authentication information and at least one piece of second distributed authentication information;

an input part configured to be able to receive the first distributed authentication information and the second distributed authentication information by action of the user; and a control part configured to control the communication part, the read part, and the input part, and wherein the program causes the control part to execute processings of:

acquiring the common authentication information and the second distributed authentication information via the read part from the user storage medium;

acquiring the second distributed authentication information via the input part by action of the user;

authenticating by collating the second distributed authentication information acquired via the read part with the second distributed authentication information acquired via the input part;

transmitting the common authentication information acquired via the read part to the server apparatus via the communication part when authenticating all of the second distributed authentication information is completed;

acquiring from the server apparatus via the communication part the first distributed authentication information associated with the common authentication information as the transmitted common same authentication information;

acquiring the first distributed authentication information via the input part by action of the user;

authenticating by collating the first distributed authentication information acquired via the communication part with the first distributed authentication information acquired via the input part; and unlocking a lock when authenticating all of the first distributed authentication information is completed.

Further, the disclosure of each PTL cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims and the figures) and based on the basic technical concept thereof. Further, it is possible to variously combine or select (or deselect if necessary) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the figures, and the technical concept of the present invention. Particularly, any numerical values or ranges disclosed herein should be interpreted that any intermediate or lower values or subranges falling within the disclosed ranges are also disclosed even without specific recital thereof. In addition, using some or all the disclosed elements in each literature cited above as necessary in combination with the elements described herein as part of the disclosure of the present invention in accordance with the object of the present invention shall be considered to be included in (or belong to) the disclosed elements of the present application.

REFERENCE SIGNS LIST

1 Authentication system
2 User
10 User storage medium
11 Read target part
12 Storage part
13 Possession information (common authentication information)
14 Biometric information (second distributed authentication information)
15 Knowledge information
16 Second biometric information
20 Authentication apparatus
21 Communication part
22 Read part
23 Storage part
24 Output part
25 Input part
26 Control part
30 Server apparatus
31 Communication part
32 Storage part
33 Control part
34 Possession information (common authentication information)
35 Knowledge information (first distributed authentication information)
36 Biometric information
37 Second knowledge information
38 Second biometric information
40 Network
100 Hardware resources
101 Processor
102 Memory
103 Network interface
104 Internal bus

What is claimed is:

1. An authentication apparatus, comprising:
at least one processor; and
a memory in circuit communication with the processor,
wherein the processor is configured to execute program instruction stored in the memory to implement:
a communication part configured to be able to communicate with a server apparatus that stores at least one piece of common authentication information and at least one piece of first distributed authentication information as registered first distributed authentication information in association with each other, via a network;

a read part configured to be able to read information from a user storage medium used by a user that stores the at least one piece of common authentication information and at least one piece of second distributed authentication information as registered second distributed authentication information;

an input part configured to be able to receive the first distributed authentication information as input first distributed authentication information and the second distributed authentication information as input second distributed authentication information by action of the user; and a control part configured to control the communication part, the read part, and the input part, wherein the control part is configured to perform processings of:

acquiring the common authentication information and the registered second distributed authentication information via the read part from the user storage medium;

acquiring the input second distributed authentication information via the input part by action of the user;

performing second authentication by collating the registered second distributed authentication information with the input second distributed authentication information;

erasing all of the second distributed authentication information of the user when authenticating all of the second distributed authentication information of the user is completed;

transmitting the common authentication information acquired via the read part to the server apparatus via the communication part after erasing;

acquiring the registered first distributed authentication information associated with the common authentication information same as the transmitted common authentication information via the communication part from the server apparatus;

acquiring the input first distributed authentication information via the input part by action of the user, after acquiring the registered first distributed authentication information from the server apparatus;

performing first authentication by collating the registered first distributed authentication information with the input first distributed authentication information; and unlocking a lock when authenticating all of the first distributed authentication information is completed, and wherein the first distributed authentication information is different from the second distributed authentication information.

2. The authentication apparatus according to claim 1, wherein:

the common authentication information is possession information;

the first distributed authentication information is knowledge information; and the second distributed authentication information is biometric information.

3. The authentication apparatus according to claim 1, wherein:

the common authentication information is possession information;

the first distributed authentication information is biometric information; and the second distributed authentication information is knowledge information.

4. The authentication apparatus according to claim 1, wherein:

the common authentication information is possession information;

the first distributed authentication information is first biometric information and/or first knowledge information; and the second distributed authentication information is second biometric information and/or second knowledge information.

5. The authentication apparatus according to claim 1, wherein the read part is configured to be able to perform wired or wireless communication with the user storage medium without intervening the network.

6. The authentication apparatus according to claim 1, wherein the control part is configured to further perform a processing of erasing all of the first distributed authentication information when authenticating all of the first distributed authentication information is completed.

7. An authentication system, comprising:

a server apparatus configured to store at least one piece of common authentication information and at least one piece of first distributed authentication information in association with each other;

a user storage medium used by a user configured to store the at least one piece of common authentication information and at least one piece of second distributed authentication information; and the authentication apparatus according to claim 1.

8. An authentication method of authenticating using an authentication apparatus, wherein the authentication apparatus comprises:

at least one processor; and a memory in circuit communication with the processor, wherein the processor is configured to execute program instruction stored in the memory to implement:

a communication part configured to be able to communicate with a server apparatus that stores at least one piece of common authentication information and at least one piece of first distributed authentication information as registered first distributed authentication information in association with each other, via a network;

a read part configured to be able to read information from a user storage medium used by a user that stores the at least one piece of common authentication information and at least one piece of second distributed authentication information as registered second distributed authentication information;

an input part configured to be able to receive the first distributed authentication information as input first distributed authentication information and the second distributed authentication information as input second distributed authentication information by action of the user; and a control part configured to control the communication part, the read part, and the input part, and wherein the authentication method comprises:

acquiring the common authentication information and the registered second distributed authentication information via the read part from the user storage medium;

acquiring the input second distributed authentication information via the input part by action of the user;

performing second authentication by collating the registered second distributed authentication information with the input second distributed authentication information;

erasing all of the second distributed authentication information of the user when authenticating all of the second distributed authentication information of the user is completed;

transmitting the common authentication information acquired via the read part to the server apparatus via the communication part after erasing;

acquiring the registered first distributed authentication information associated with the common authentication information same as the transmitted common authentication information via the communication part from the server apparatus;

acquiring the input first distributed authentication information via the input part by action of the user, after acquiring the registered first distributed authentication information from the server apparatus;

performing first authentication by collating the registered first distributed authentication information with the input first distributed authentication information; and unlocking a lock when authenticating all of the first distributed authentication information is completed.

9. A non-transitory computer readable recording medium storing a program causing an authentication apparatus to perform authentication processing, wherein the authentication apparatus comprises at least one processor configured to execute the program to implement:

a communication part configured to be able to communicate with a server apparatus that stores at least one piece of common authentication information and at least one piece of first distributed authentication information as registered first distributed authentication information in association with each other, via a network;

a read part configured to be able to read information from a user storage medium used by a user that stores the at least one piece of common authentication information and at least one piece of second distributed authentication information as registered second distributed authentication information;

an input part configured to be able to receive the first distributed authentication information as input first distributed authentication information and the second distributed authentication information as input second distributed authentication information by action of the user; and a control part configured to control the communication part, the read part, and the input part, and wherein the program causes the control part to execute processings of:

acquiring the common authentication information and the registered second distributed authentication information via the read part from the user storage medium;

acquiring the input second distributed authentication information via the input part by action of the user;

performing second authentication by collating the registered second distributed authentication information with the input second distributed authentication information;

erasing all of the second distributed authentication information of the user when authenticating all of the second distributed authentication information of the user is completed;

transmitting the common authentication information acquired via the read part to the server apparatus via the communication part after erasing;

acquiring the registered first distributed authentication information associated with the common authentication information same as the transmitted common authentication information via the communication part from the server apparatus;

acquiring the input first distributed authentication information via the input part by action of the user, after acquiring the registered first distributed authentication information from the server apparatus;

performing first authentication by collating the registered first distributed authentication information with the input first distributed authentication information; and unlocking a lock when authenticating all of the first distributed authentication information is completed.

10. The authentication apparatus according to claim 2, wherein the read part is configured to be able to perform wired or wireless communication with the user storage medium without intervening the network.

11. The authentication apparatus according to claim 3, wherein the read part is configured to be able to perform wired or wireless communication with the user storage medium without intervening the network.

12. The authentication apparatus according to claim 4, wherein the read part is configured to be able to perform wired or wireless communication with the user storage medium without intervening the network.

13. The authentication apparatus according to claim 2, wherein the control part is configured to further perform a processing of erasing all of the first distributed authentication information when authenticating all of the first distributed authentication information is completed.

14. The authentication apparatus according to claim 3, wherein the control part is configured to further perform a processing of erasing all of the first distributed authentication information when authenticating all of the first distributed authentication information is completed.

15. The authentication apparatus according to claim 4, wherein the control part is configured to further perform a processing of erasing all of the first distributed authentication information when authenticating all of the first distributed authentication information is completed.

* * * * *